United States Patent [19]

Lo

[11] Patent Number: 5,419,736
[45] Date of Patent: May 30, 1995

[54] DEVICE FOR CLEARING MATERIAL WASTE

[76] Inventor: Neng S. Lo, No. 546, Sec. 1, Feng Shih Rd., Fengyuan City, Taichung Hsien, Taiwan, Prov. of China

[21] Appl. No.: 218,517

[22] Filed: Mar. 28, 1994

[51] Int. Cl.⁶ .............................................. B24B 55/04
[52] U.S. Cl. ................................. 451/451; 451/453; 451/454; 451/457; 277/152; 403/109
[58] Field of Search ................. 51/268, 270, 271, 274, 51/262 R; 83/157; 606/122, 1; 128/20; 403/109, 80; 277/152, 165, 9, 11, 53, 208

[56] References Cited

U.S. PATENT DOCUMENTS

| | | | |
|---|---|---|---|
| 4,792,243 | 12/1988 | Takeuchi et al. | 277/152 |
| 4,805,919 | 2/1989 | Wiblyi et al. | 277/152 |
| 5,004,203 | 4/1991 | Fabius | 403/109 |
| 5,285,702 | 2/1994 | Hillinger | 403/109 |

FOREIGN PATENT DOCUMENTS 2611826  9/1988  France.
4277378 10/1992  Japan.

OTHER PUBLICATIONS

CR Seals Handbook (Catalog #457010), 1986.

*Primary Examiner*—Maurina T. Rachuba
*Assistant Examiner*—Derris H. Banks
*Attorney, Agent, or Firm*—Merchant, Gould, Smith, Edell, Welter & Schmidt

[57] ABSTRACT

A device for clearing material waste from telescopic plates of a cutting machine and includes an affixing element and a clearing rubber mounted to an underside of each telescopic plate. The affixing element has at least one groove to hold the clearing rubber which has a clearing edge and sliding surfaces. The clearing edge clears material waste from the upper surface of its adjacent plate, when the plates are retracted.

3 Claims, 3 Drawing Sheets

DEVICE FOR CLEARING MATERIAL WASTE

BACKGROUND OF THE INVENTION

The present invention relates to a device for clearing material waste and, more particularly, to a device for clearing material waste from telescopic plates of a cutting machine.

When manufacturing a product, especially using a lathe, milling or grinding machines, there is an amount of material waste produced. However, when the mechanism for feeding tools of the machines, such as lathe tools, is controlled by an action of threaded bolts, too much waste will therefore fall onto the threaded bolts, which causes an obstacle to normal feeding of the tools.

The objective of the present invention is to provide a firmly fixed clearing rubber with a clearing edge and to provide less friction between the rubber and the telescopic plates.

SUMMARY OF THE INVENTION

A particular objective of the present invention is to provide a device for clearing material waste from telescopic plates of a cutting machine which includes an affixing element and a clearing rubber mounted to an underside thereof. The affixing element has at least one groove to hold the clearing rubber which has a clearing edge and sliding surfaces, and which provides better efficiency for clearing material waste when the plates are retracted.

Further objectives, advantages and novel features of the invention will become more apparent from the following detailed description when taken in conjunction with the accompanying drawings.

DETAILED DESCRIPTION OF THE PREFERRED EMBODIMENT

Figure 1:
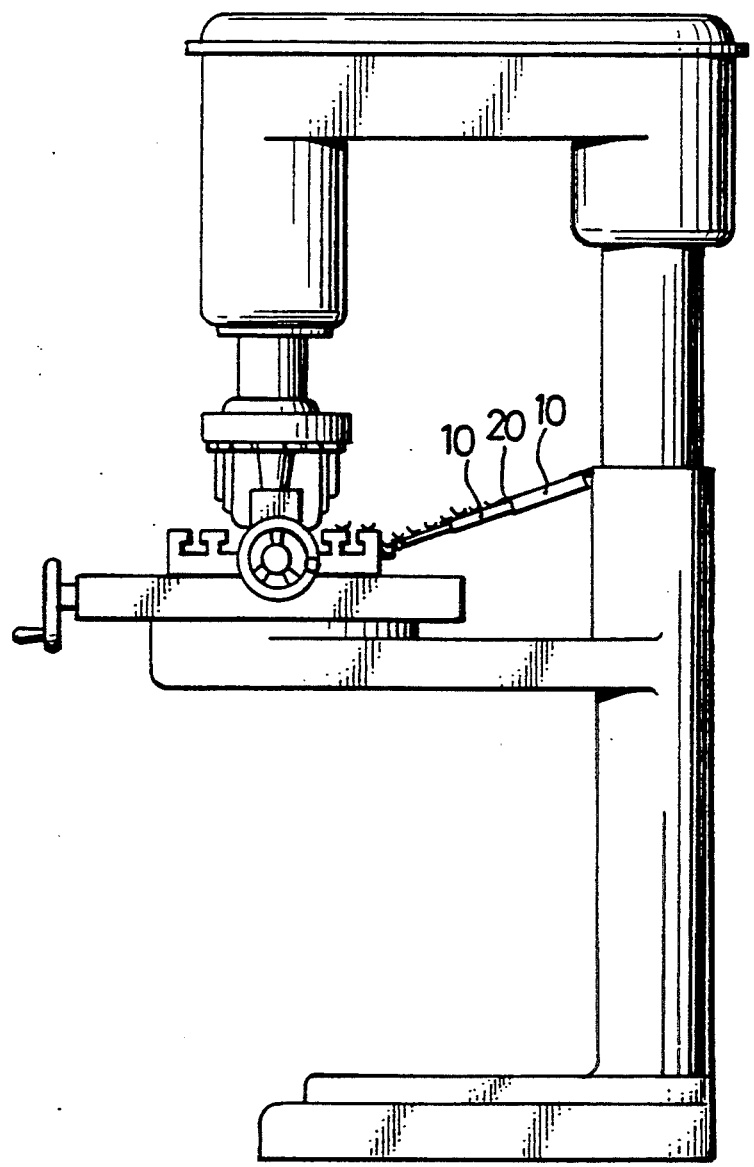
FIG. 1 is a perspective view of a cutting machine with telescopic plates equipped with a device for clearing material waste in accordance with the present invention.
Figure 2:
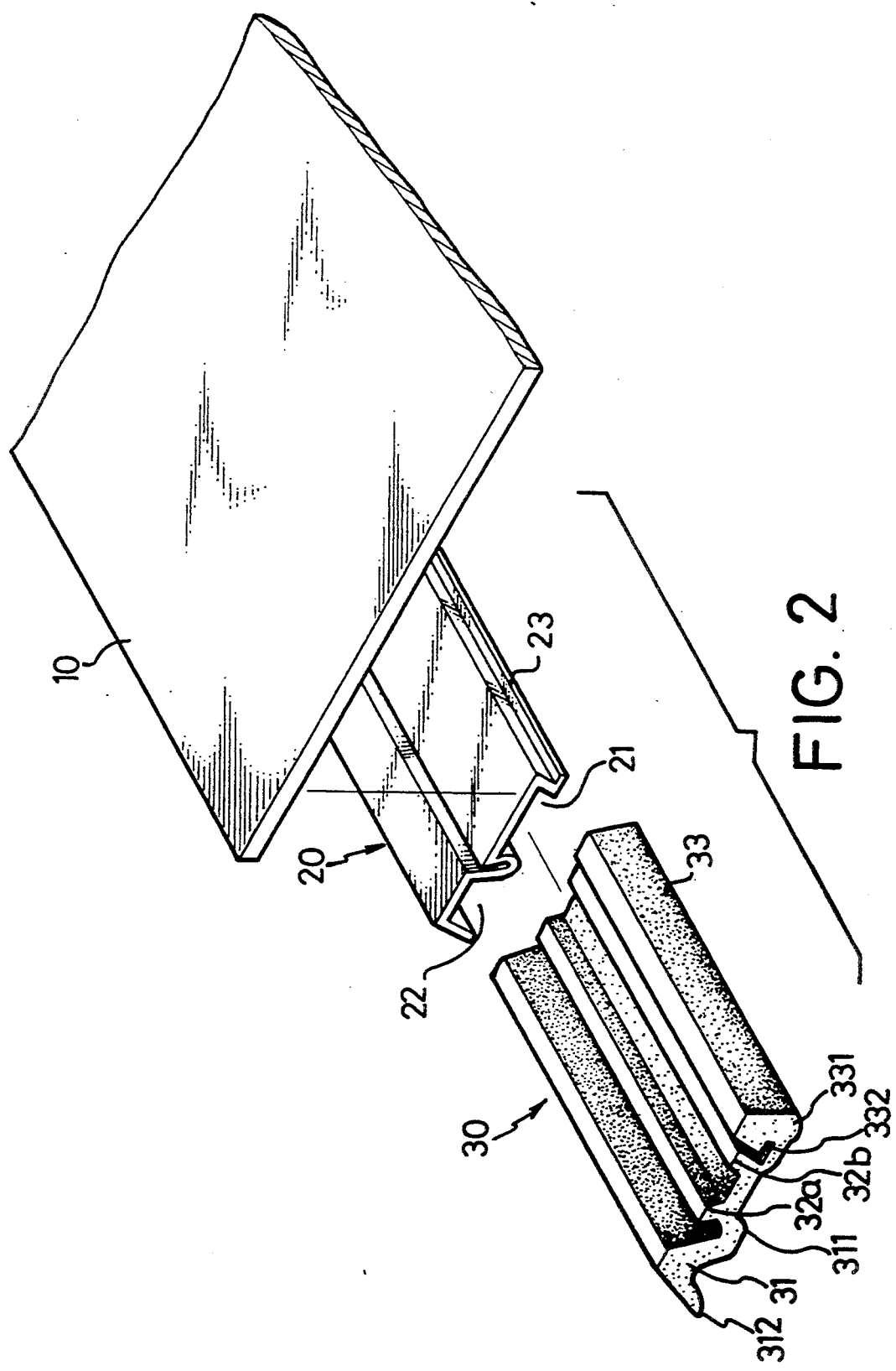
FIG. 2 is an exploded view of a device for clearing material waste in accordance with the present invention.
Figure 3:
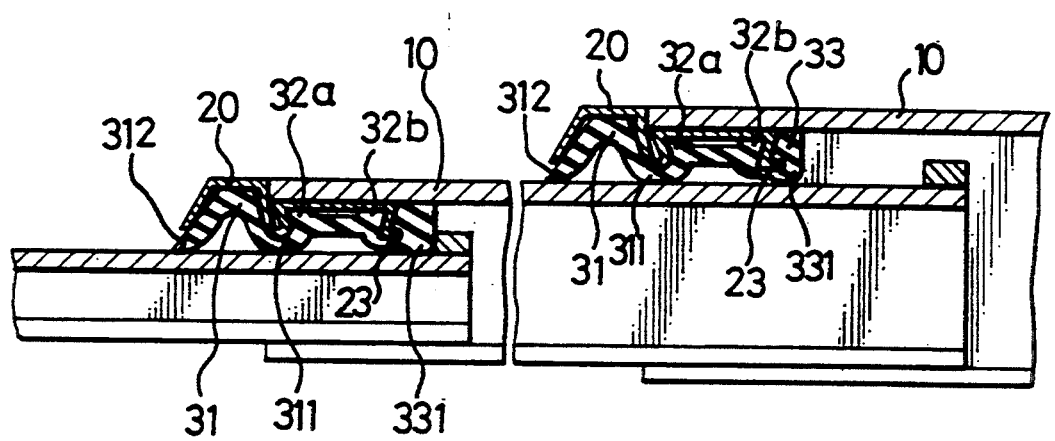
FIG. 3 is a cross sectional view of the device for clearing material waste in accordance with the present invention.

Referring to the drawings, a device for clearing material waste comprises a plurality of telescopic plates 10 each having an affixing element 20 mounted to an edge and a bottom thereof. A dovetail groove 21 and an inverted V-shaped groove 22 extend laterally along an underside of the affixing element 20, and a flange 23 extends outwardly and horizontally from an end of the affixing element 20 which is adjacent to the dovetail groove 21. A clearing rubber 30 comprises two tongues 32a and 32b which are securely received in the dovetail groove 21, and an inverted V-shaped rail 31 is received in the inverted V-shaped groove 22. The inverted V-shaped rail 31 has a clearing edge 312 formed along one edge thereof. The clearing rubber 30 further includes a side wall 33 which has a sliding surface 331 extending downward from a bottom thereof and a L-shaped groove is formed between tongue 32b and the side wall 33 to securely receive the flange 23 of the affixing element 20. Preferably, the inverted V-shaped rail 31, the tongues 32a and 32b, and the side wall 33 are integral components of the clearing rubber 30. Preferably, a further sliding surface 311 may be formed on a bottom surface of the clearing rubber 30 between the inverted V-shaped rail 31 and tongue 32a.

Accordingly, the device for clearing material waste provides sliding surfaces 311, 331 to reduce friction between the clearing rubber 30 and the upper surface of the plates 10, and the clearing rubber 30 firmly engages with the affixing element 20, so that the clearing edge 312 may operate perfectly. In operation, when material waste is discarded from the cutter of the cutting machine it is deposited on the upper surface of the extended telescopic plates 10. When the plates are retracted, each clearing edge slides over an upper surface of a corresponding lower plate and clears material waste therefrom.

I claim:

1. A device for clearing material waste for a cutting machine, comprising a plurality of telescopic plates, each said plate having an affixing element mounted to an underside thereof, an inverted V-shaped groove and a dovetail groove formed along an underside of said affixing element, a flange extending outwardly and laterally from an end of said affixing element and adjacent to the dovetail groove; a clearing rubber comprising a plurality of tongues which are securely received in said dovetail groove, an inverted V-shaped rail received in said V-shaped groove, said inverted V-shaped rail having a clearing edge formed along one edge thereof, a side wall of said clearing rubber having a sliding surface extending downward from a bottom of said clearing rubber, and an L-shaped groove formed in said clearing rubber between said tongues and said side wall to securely receive the flange of said affixing element.

2. A device for clearing material waste as claimed in claim 1 wherein said inverted V-shaped rail, said tongues, and said side wall are integrally formed.

3. A device for clearing material waste as claimed in claim 1 wherein said sliding surface is formed between said inverted V-shaped rail and said tongues.

* * * * *